United States Patent
Hiramatsu et al.

(10) Patent No.: US 9,871,901 B2
(45) Date of Patent: Jan. 16, 2018

(54) MICROPHONE HOLDING STRUCTURE AND ELECTRONIC DEVICE

(71) Applicants: Takahiro Hiramatsu, Kanagawa (JP); Tsutomu Osawa, Kanagawa (JP)

(72) Inventors: Takahiro Hiramatsu, Kanagawa (JP); Tsutomu Osawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/233,107

(22) Filed: Aug. 10, 2016

(65) Prior Publication Data

US 2016/0352879 A1    Dec. 1, 2016

Related U.S. Application Data

(63) Continuation of application No. PCT/JP2015/054670, filed on Feb. 19, 2015.

(30) Foreign Application Priority Data

Feb. 24, 2014   (JP) .................................. 2014-033288
May 20, 2014   (JP) .................................. 2014-104108

(51) Int. Cl.
*H04M 1/00*    (2006.01)
*H04M 1/03*    (2006.01)
(Continued)

(52) U.S. Cl.
CPC ............... *H04M 1/03* (2013.01); *H04M 1/19* (2013.01); *H04M 1/20* (2013.01); *H04R 1/2892* (2013.01)

(58) Field of Classification Search
CPC . H04M 1/03; H04M 1/19; H04M 1/20; H04R 1/2892
See application file for complete search history.

(56) References Cited

U.S. PATENT DOCUMENTS 5,054,079 A    10/1991  Frielingsdorf et al.
7,929,050 B2 *  4/2011  Liang ................. H04N 1/00519
                                                    348/373

(Continued)

FOREIGN PATENT DOCUMENTS

CN    202889565 U    4/2013
EP    1 670 219 A1   6/2006

(Continued)

OTHER PUBLICATIONS

Singaporean Office Action dated Nov. 28 2016 in Patent Application No. 11201606777V.

(Continued)

*Primary Examiner* — Tuan D Nguyen
(74) *Attorney, Agent, or Firm* — Oblon, McClelland, Maier & Neustadt, L.L.P.

(57) ABSTRACT

A holding structure for holding a microphone includes a chassis configured to be separated into at least a first chassis and a second chassis; an elastic member formed of an elastic material, the elastic member including a holding unit configured to hold the microphone and an attachment portion provided in a periphery of the holding unit; and a retention member configured to retain the attachment portion at a predetermined position of the first chassis. The retention member is fixed to the first chassis by the second chassis in a state where the second chassis is attached to the first chassis.

8 Claims, 15 Drawing Sheets

(51) Int. Cl.
*H04R 1/28* (2006.01)
*H04M 1/19* (2006.01)
*H04M 1/20* (2006.01)

(56) References Cited

U.S. PATENT DOCUMENTS

| | | | | |
|---|---|---|---|---|
| 8,570,434 | B2* | 10/2013 | Odanaka | H04N 5/2252 |
| | | | | 348/373 |
| 8,817,971 | B2 | 8/2014 | Shida et al. | |
| 2010/0188549 | A1* | 7/2010 | Ichieda | H04N 1/00127 |
| | | | | 348/333.01 |
| 2010/0289906 | A1* | 11/2010 | Kaye | G09B 7/00 |
| | | | | 348/207.11 |
| 2012/0182470 | A1* | 7/2012 | Odanaka | H04N 5/2252 |
| | | | | 348/374 |
| 2014/0044257 | A1 | 2/2014 | Shida et al. | |

FOREIGN PATENT DOCUMENTS

| JP | S58-125483 U | 8/1983 |
|---|---|---|
| JP | S61-197789 U | 12/1986 |
| JP | S62-203549 U | 12/1987 |
| JP | H05-009059 U | 2/1993 |
| JP | H06-031293 U | 4/1994 |
| JP | 2003-299173 | 10/2003 |
| JP | 2004-304263 | 10/2004 |
| JP | 2004-312094 | 11/2004 |
| JP | 2012-235264 | 11/2012 |
| JP | 2013-157763 | 8/2013 |

OTHER PUBLICATIONS

Extended European Search Report dated Jan. 26, 2017 in Patent Application No. 15751749.1.

International Search Report dated Apr. 7, 2015 in PCT/JP2015/054670 filed on Feb. 19, 2015 ( with English Translation).

Written Opinion dated Apr. 7, 2015 in PCT/JP2015/054670 filed on Feb. 19, 2015.

* cited by examiner

A-A

MICROPHONE HOLDING STRUCTURE AND ELECTRONIC DEVICE

CROSS-REFERENCE TO RELATED APPLICATIONS

The present application is a continuation application of International Application No. PCT/JP2015/054670, filed Feb. 19, 2015, which claims priority to Japanese priority applications No. 2014-033288 filed on Feb. 24, 2014 and No. 2014-104108 filed on May 20, 2014. The contents of these applications are incorporated herein by reference in their entirety.

BACKGROUND OF THE INVENTION

1. Field of the Invention

The disclosures herein generally relate to holding structure of a microphone and an electronic device.

2. Description of the Related Art

A conference system for conducting a remote conference with a remote location via a communication network such as the Internet is popular. In such a conference system, for example, images or voices of participants or the like of the remote conference are acquired by terminal devices for conference, converted into digital data, and sent to a terminal device of a communication destination. The terminal device of the communication destination displays the image of the participant that is received and outputs the voice of the participant. Such processes are performed bi-directionally, and thereby, the participants of the remote conference can conduct a video conference with the remote location in a state near an actual conference.

For example, when a speaker and a microphone are installed in a small-sized chassis of a terminal device used in such a conference system, there is a problem that a vibration of the speaker due to the sound output propagates to the chassis of the terminal device, and furthermore the vibration propagates from the chassis to the microphone. When the terminal device has an echo canceller, in a usual case, even if a voice reproduced from a speaker is input into a microphone, according to the function of the echo canceller, an echo component is removed. However, when the microphone picks up a vibration of the chassis, as described above, a distorted reproduction sound from the speaker is input to the microphone. That is, a path for transmitting voice from the speaker to the microphone is non-linear, and an echo may not be removed sufficiently.

As a technique for suppressing such propagation of a vibration of the chassis to the microphone, a technique of holding the microphone in a floating state is known. For example, a holding structure for microphone is known, in which a microphone is held in a floating state using a magnetic force to block an environmental vibration or noise (See, for example, Japanese Unexamined Patent Application Publication No. 2004-312094). Moreover, an electronic device in which a microphone is elastically supported inside a cabinet, a rear side of the microphone is covered with a back cover formed of a rubber-like elastic body, and the back cover is fixed to the cabinet using a fixation screw is known (See, for example, Japanese Unexamined Patent Application Publication No. 2004-304263). Furthermore, an attachment mechanism for microphone having an elastic member for covering a side face of a microphone with an approximately cylindrical shape and a retention member for retaining the microphone by engaging with the elastic member is known (See, for example, Japanese Unexamined Patent Application Publication No. 2003-299173).

SUMMARY OF THE INVENTION

According to an embodiment, a holding structure for holding a microphone includes a chassis configured to be separated into at least a first chassis and a second chassis; an elastic member formed of an elastic material, the elastic member including a holding unit configured to hold the microphone and an attachment portion provided in a periphery of the holding unit; and a retention member configured to retain the attachment portion at a predetermined position on the first chassis. The retention member is fixed to the first chassis by the second chassis in a state where the second chassis is attached to the first chassis.

BRIEF DESCRIPTION OF THE DRAWINGS

Other objects and further features of embodiments will be apparent from the following detailed description when read in conjunction with the accompanying drawings.

DESCRIPTION OF THE PREFERRED EMBODIMENTS

In the following, embodiments of the present invention will be described with reference to the accompanying drawings.

<Configuration Example of Electronic Device>

Figure 1:
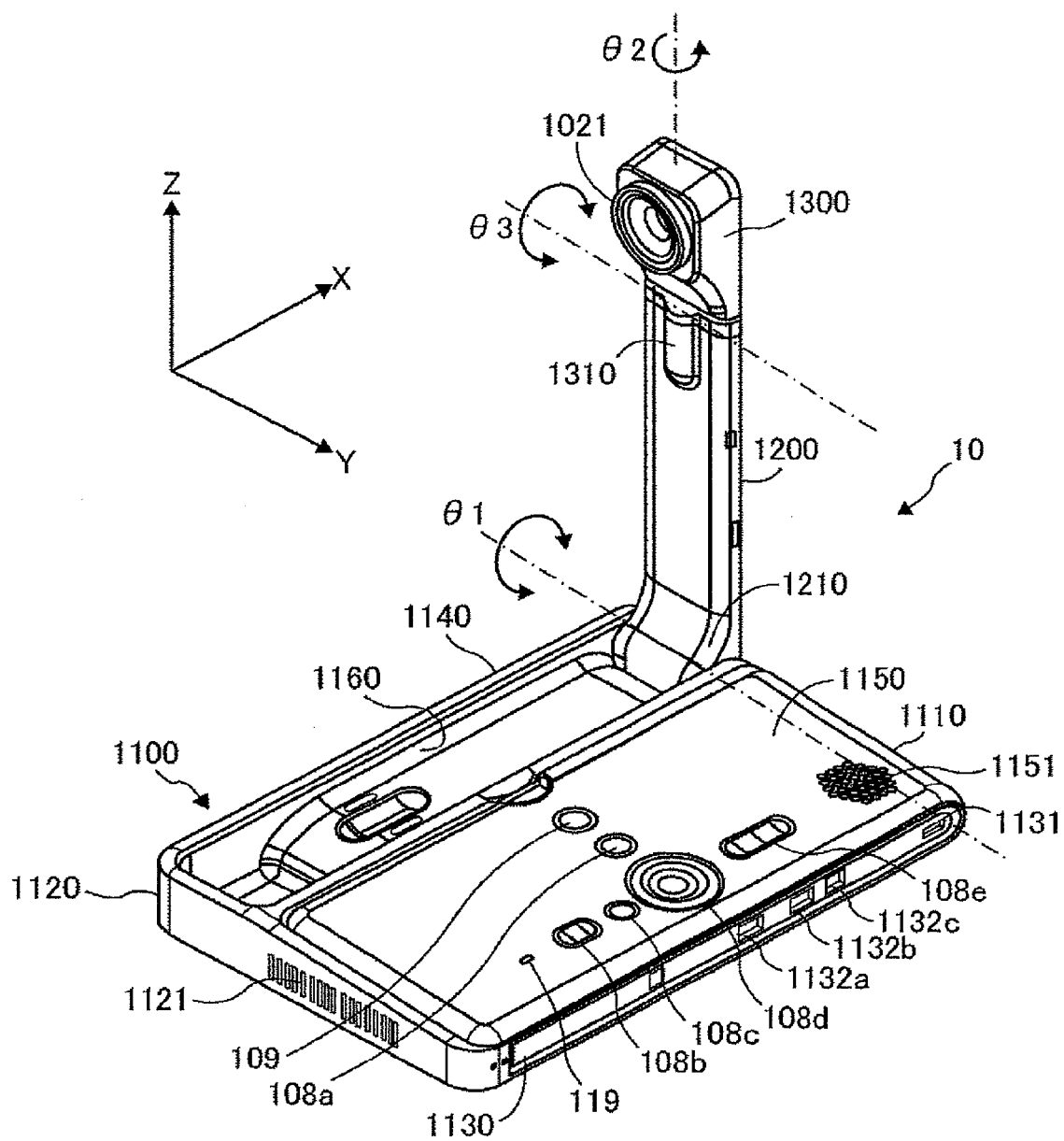
FIG. 1 is an external view depicting a conference apparatus according to an embodiment.

FIG. 1 is an external view depicting a conference apparatus according to an embodiment. The conference apparatus 10 illustrated in FIG. 1 is an example of electronic devices disclosed in the present application, and is a terminal device used in a remote conference system. The electronic devices disclosed in the present application include various electronic devices provided with a microphone in a chassis, such as a mobile phone apparatus, a telephone apparatus, an intercom apparatus, a picture recorder, and an imaging device, for example.

In FIG. 1, the conference apparatus 10 includes a chassis 1100, an arm 1200 and a camera housing 1300. Among them, a front side wall 1110 of the chassis 1100 has an inlet face (not illustrated) including a plurality of inlet holes, and a rear side wall 1120 of the chassis 1100 has an exhaust face 1121 on which a plurality of exhaust holes are formed. Accordingly, by driving a cooling fan included in the chassis 1100, air anterior to the conference apparatus 10 can be taken in via the inlet face (not illustrated) and exhausted to the rear of the conference apparatus 10 via the exhaust face 1121. On a right-side wall 1130 of the chassis 1100 a sound pickup hole 1131 is formed, and a microphone incorporated in the chassis 1100 is capable of picking up an ambient sound, such as voice or sound.

An operation panel 1150 is formed toward the right-side wall 1130 on an upper face of the chassis 1100. The operation panel 1150 is provided with a plurality of operation buttons (108a through 108e), a power switch 109, an alarm lamp 119, and the like. Moreover, the operation panel 1150 is also provided with a sound output face 1151, which is formed of a plurality of sound output holes for allowing output sound from a built-in speaker 115 to pass through. In addition, an accommodation portion 1160 serving as a recess for accommodating the arm 1200 and the camera housing 1300 is formed toward a left-side wall 1140 on the upper face of the chassis 1100.

A plurality of connection ports (1132a through 1132c) for connecting cables, such as a wired LAN (Local Area Network) or a USB (Universal Serial Bus) are provided on the right-side wall 1130 of the chassis 1100. In contrast, a connection port (not illustrated) for connecting a cable for a display device is provided toward the left-side wall 1140 of the chassis 1100.

Next, the arm 1200 is attached to the chassis 1100 via a torque hinge 1210 and is configured to be rotatable in the vertical direction within a range of a tilt angle θ1 of 135 degrees with respect to the chassis 1100. FIG. 1 indicates a state in which the tilt angle θ1 is 90 degrees.

The camera housing 1300 is provided with a built-in camera 1021, and can capture an image of a user, a document, a room, or the like. In addition, the camera housing 1300 has a torque hinge 1310. The camera housing 1300 is attached to the arm 1200 via the torque hinge 1310. Moreover, the camera housing 1300 is configured to be rotatable in the vertical and horizontal directions within a range of a pan angle θ2 of from 180 degrees to +180 degrees and a tilt angle θ3 of from −45 degrees to +45 degrees with respect to the arm 1200, where the state illustrated in FIG. 1 is 0 degrees.

The above-described sound pickup hole 1131, the sound output face, the plurality of operation buttons (108a through 108e), the power switch 109 of the like can be arranged at an arbitrary position on the chassis 1100. Moreover, ranges of motion of the tilt angle θ1, the pan angle θ2, and the tilt angle θ3 are an example. The ranges of motion can be arbitrarily set.

Figure 2:
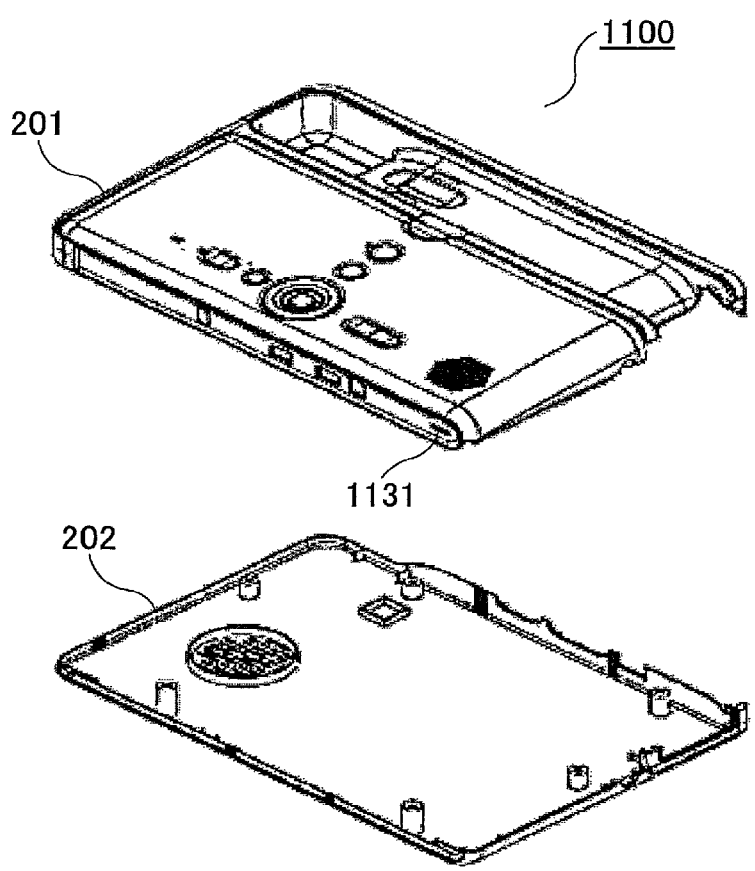
FIG. 2 is a diagram depicting an example configuration of a chassis of the conference apparatus according to the embodiment.

FIG. 2 is a diagram depicting an example configuration of a chassis of the conference apparatus according to the embodiment. As illustrated in FIG. 2, the chassis 1100 of the conference device 10 has, for example, a chassis upper cover 201 (first chassis) and a chassis lower cover 202 (second chassis) which can be separated in the thickness direction from each other. On the chassis upper cover 201, the sound pickup hole 1131, described as above, is provided. As a material of the chassis 1100, for example, a hard resin or the like, such as a plastic, is used. In addition, the chassis 1100 may be separated into not two but three or more pieces.

<Holding Structure of Microphone>

Figure 3:
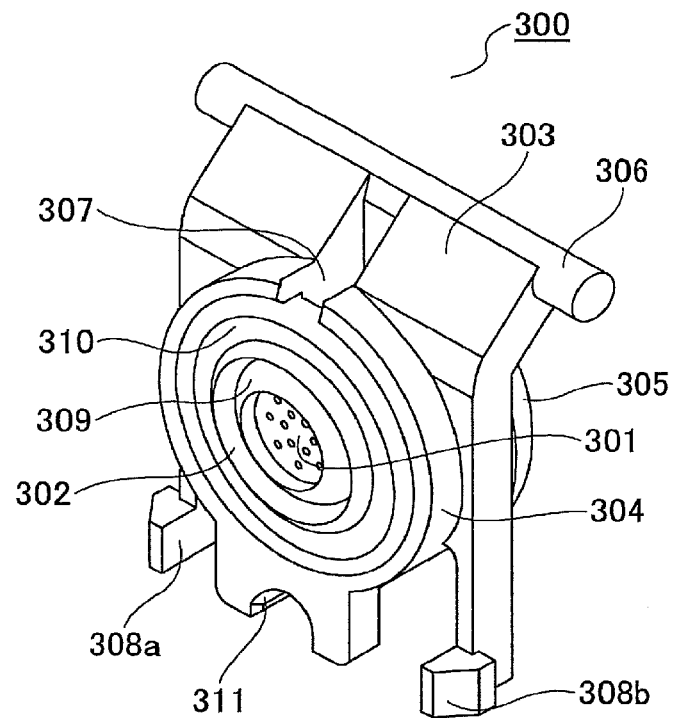
FIG. 3 is a perspective view depicting a holding structure for a microphone according to the embodiment.

FIG. 3 is a perspective view depicting a holding structure for a microphone according to the embodiment. A holding structure of the microphone according to the embodiment includes a microphone 301, a microphone rubber 302 (elastic member) arranged around the microphone 301, and a microphone holder 303 (retention member) retaining the microphone 301 and the microphone rubber 302.

The microphone 301 is a device converting a picked up sound into an electric signal. The microphone 301 has a shape of, for example, an approximately cylindrical form, and picks up voice/sound from the front, to output a voice signal converted into an electric signal from the rear surface by a cable or the like.

The microphone rubber 302 is an elastic member formed of an elastic material such as a silicone rubber or a butyl rubber, for example. The microphone rubber 302 includes a holding unit 309 for retaining the microphone 301 and a flange portion (attachment portion) 310 arranged around the holding unit 309.

Figure 4A:
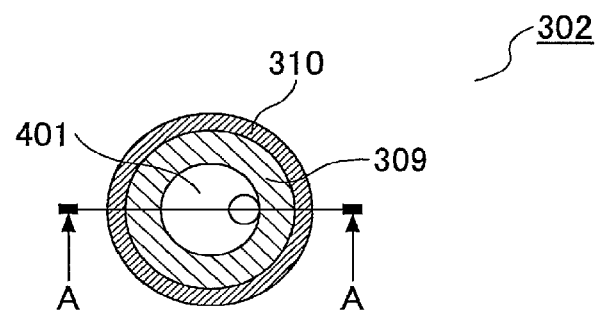
FIGS. 4A to 4D are diagrams depicting an example of a microphone rubber according to the embodiment.
Figure 4B:
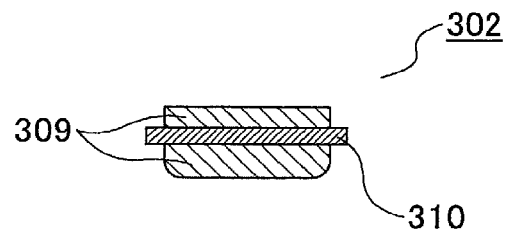
Figure 4C:
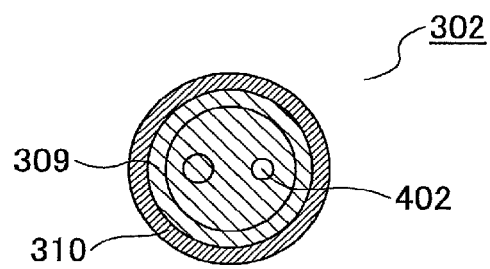
Figure 4D:
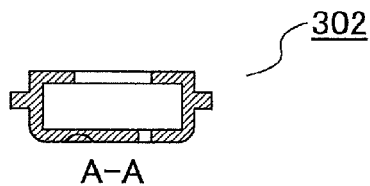

FIGS. 4A through 4D are diagrams depicting an example of a microphone rubber according to the embodiment. FIG. 4A is a top view of the microphone rubber 302. FIG. 4B is a side view, and FIG. 4C is a bottom view. FIG. 4D is a cross-sectional view cut along A-A in FIG. 4A.

The holding unit 309 of the microphone rubber 302 is formed, for example, so as to cover the microphone 301. On an upper face of the holding unit 309 an opening 401 for picking up sound is provided, and on a lower face a hole 402 for drawing out a cable is provided. Moreover, an inner wall of the holding unit 309 is formed, for example, approximately in contact with a periphery of the microphone 301, and retains the microphone 301. FIGS. 4A through 4D illustrate a configuration that retains the microphone 301 by the entire inner wall of the holding unit 309. However, the configuration is an example. The configuration may be, for example, forming a plurality of projection portions on the inner wall of the holding unit 309 and retaining the microphone 301 by the projection portions or the like.

When the microphone 301 is incorporated into the microphone rubber 302, the opening 401 is expanded using the elasticity of the microphone rubber 302, and the microphone 301 can be engaged with the holding unit 309 of the microphone rubber 302.

The flange portion 310 of the microphone rubber 302 is arranged around the holding unit 309, as illustrated in FIGS. 4A through 4D, and is an attachment portion projected from the holding unit 309.

The elastic member used for the microphone rubber 302 preferably exhibits low transmissibility upon resonance (resonance magnification) occurring. That is, the greater the loss factor of a material is, the higher the vibration insulation effect is. Moreover, a resonance point can be adjusted depending on hardness of the material of the microphone rubber 302. When the hardness of the material is low, the resonance point (resonance frequency) is low, and when the hardness is great, the resonance point is great.

The resonance point of the microphone rubber 302 is preferably different from frequency of an excitation source (oscillation source). For example, in the conference apparatus 10, the excitation source is a speaker, and the reproduction frequency is, for example, 300 Hz through 12000 Hz, which is a wide bandwidth. Therefore, setting the resonance frequency of the microphone rubber 302 outside the reproduction frequency of the speaker is difficult. However, if possible, the resonance frequency of the microphone rubber 302 is preferably less than 300 Hz or greater than 12000 Hz. However, even when the microphone rubber resonates, in a case of employing a material having a great loss factor, because the resonance magnification is small, and propagation of oscillation from the chassis can be suppressed.

Here, returning to FIG. 3, the explanation for the holding structure of the microphone will be continued.

The microphone holder 303 is a retention member for retaining the flange portion 310 of the microphone rubber 302 that retains the microphone 301 at a predetermined position of the chassis 1100, and thereby retaining the microphone 301 in a floating state. The microphone holder 303 is formed of, for example, a material having elasticity, a plastic or the like. The microphone holder 303 may hold the flange portion 310 between the chassis 1100 and the microphone holder 303 in a state of being attached to the chassis 1100, and thereby retaining the flange portion 310 at a predetermined position of the chassis 1100. The flange portion 310 is projected from the holding unit 309, and the flange portion 310 that is the projected portion may be held between the chassis 1100 and the microphone holder 303, and thereby the flange portion 310 is retained at a predetermined position of the chassis 110.

The microphone holder 303 is formed so as to cover the microphone rubber 302 on the side surface 304 and on the rear surface 305. Therefore, transmission of noise by a fan or the like inside the chassis 1100 to the microphone 301 is reduced. Moreover, the microphone holder 303 includes an attachment shaft 306, a cable drawing out unit 307, claw portions 308a, 308b, a notch unit 311 for positioning, or the like. Upon assembling, for example, after the microphone 301 is placed in the microphone rubber 302, the microphone rubber 302 is put on the microphone holder 303. Then, the microphone holder 303 is attached to the chassis upper cover 201.

Figure 5:
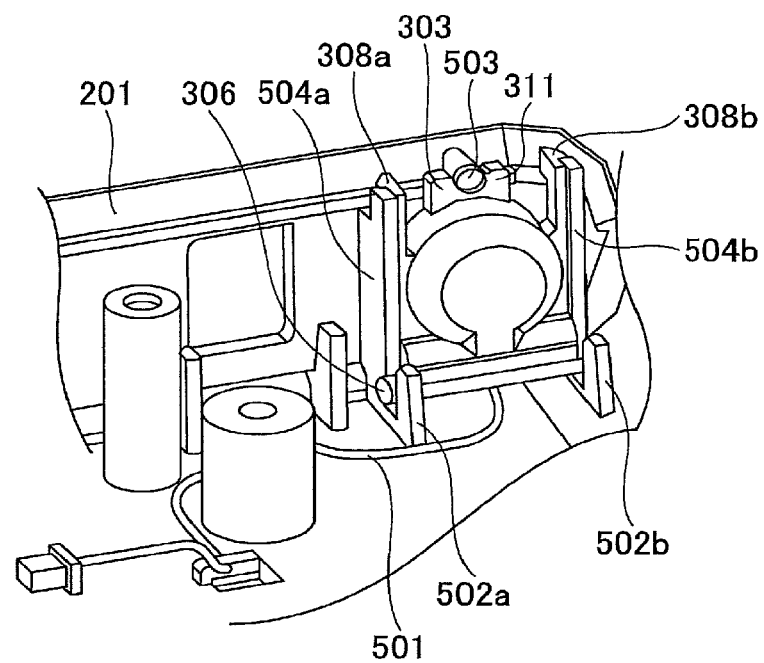
FIG. 5 is a diagram depicting an example attachment of a microphone holder to a chassis upper cover according to the embodiment.

FIG. 5 is a diagram depicting an example attachment of the microphone holder to the chassis upper cover according to the embodiment. The chassis upper cover 201 includes bearing portions 502a, 502b for supporting the attachment shaft 306 of the microphone holder 303, a projection portion 503 for positioning the microphone holder 303, first rib portions 504a, 504b arranged corresponding to the claw portions 308a, 308b, or the like.

In FIG. 5, the microphone holder 303 is rotatable around the attachment shaft 306, with respect to the chassis upper cover 201. Upon being attached to the chassis upper cover 201, in a state where the microphone holder 303 is inclined with respect to the right side wall 1130 of the of the chassis upper cover 201 (See FIG. 1), the attachment shaft 306 is engaged with the bearing portions 502a, 502b of the chassis upper cover 201. Next, the microphone holder 303 is rotated around the attachment shaft 306 toward the right side wall 1130, and the claw parts 308a, 308b of the microphone holder 303 are locked at the rib portions 504a, 504b. In the embodiment, the notch 311 for positioning the microphone holder 303 is fitted to the projection portion 503 for positioning the chassis upper cover 201, and thereby enhancing accuracy of attachment position of the microphone 301 and the microphone holder 303. Moreover, in the embodiment, because the microphone holder 303 is attached to the chassis upper cover 201 by the claw portions 308a, 308b, screw clamping becomes unnecessary, and a configuration where attachment and detachment for the microphone 301 within a limited space is easy can be provided.

A cable harness that outputs sound signals from the microphone 301 can be drawn through the hole for cable drawing 402 of the microphone rubber 302 and the cable drawing unit 307 of the microphone holder 303.

Figure 6:
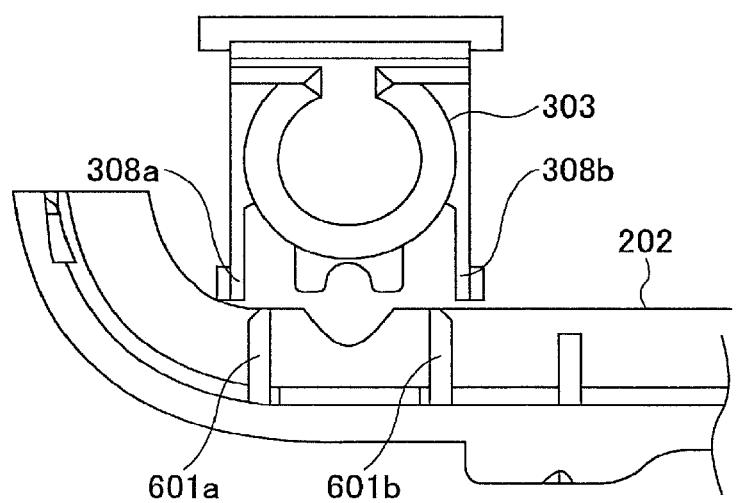
FIG. 6 is a diagram depicting a relation between a chassis lower cover and the microphone holder according to the embodiment.

FIG. 6 is a diagram depicting a relation between the chassis lower cover and the microphone holder according to the embodiment. In the embodiment, a structure is provided, in which after the microphone holder 303, on which the microphone 301 and the microphone rubber 302 are mounted, is attached to the chassis upper cover 201, as illustrated in FIG. 5, the chassis lower cover is closed (attached). When the chassis lower cover 202 is closed, for example, the chassis upper cover 201 may be placed with the opening 401 facing upward so that the chassis lower cover 202 is attached from above, or the chassis upper cover 201 may be attached on the chassis lower cover 202.

Moreover, the chassis lower cover 202 is provided with second rib portions 601a, 601b for fixing the microphone holder 303 arranged so as to contact the inside of the claw portions 308a, 308b of the microphone holder 303 when the chassis lower cover 202 is closed. Accordingly, a structure in which when the chassis lower cover 202 is closed, the claw portions 308a, 308b of the microphone holder 303 open outward by the second rib portions 601a, 601b, is provided. Moreover, on upper faces of the second rib portions 601a, 601b of the chassis lower cover 202, for example, inclined surfaces facing outward are provided, as illustrated in FIG. 6. Accordingly, the second rib portions 601a, 601b smoothly contact the inside of the claw portions 308a, 308b of the microphone holder 303.

Figure 7A:
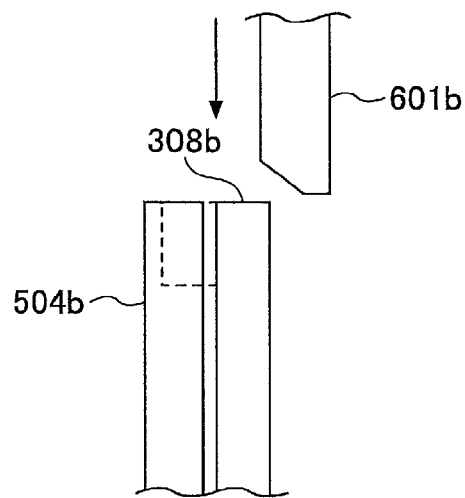
FIGS. 7A and 7B are diagrams for explaining a fixation of the microphone holder by the chassis lower cover according to the embodiment.
Figure 7B:
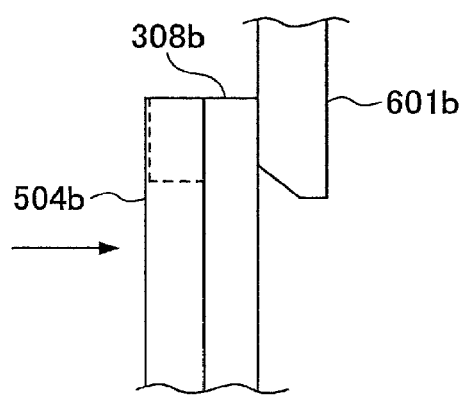

FIGS. 7A and 7B are diagrams for explaining a fixation of the microphone holder by the chassis lower cover according to the embodiment. FIG. 7A depicts a state of the claw portion 308b of the microphone holder 303 and the second rib portion 601b of the chassis lower cover 202 before the chassis lower cover 202 is closed (state of FIG. 5). Moreover, FIG. 7B depicts a state of the claw portion 308b of the microphone holder 303 and the second rib portion 601b of the chassis lower cover 202 after the chassis lower cover 202 is closed from the state of FIG. 5.

When the chassis lower cover 202 is closed from the state of FIG. 7B, the second rib portion 601b of the chassis lower cover 202 contacts the inside (right side in FIG. 7) of the claw portion 308b for fixing the microphone holder 303, and presses the claw portion 308b toward the side of the first rib portion 504b of the chassis upper cover 201. In this way, the claw portions 308a, 308b are pressed against the rib portions 504a, 504b of the chassis upper cover 201, and thereby the microphone holder 303 is fixed to the chassis upper cover 201 (chassis 1100). Thus, in the embodiment, when the chassis lower cover 202 is closed, according to elastic force of the claw portions 308a, 308b of the microphone holder 303, the microphone holder 303 is tightly and accurately fixed to the chassis upper cover 201. In the embodiment, when the chassis lower cover 202 is detached from the chassis upper cover 201, the claw portion 308b of the microphone holder 303 is restored from the state of FIG. 7B to the state of FIG. 7A, and becomes a state where the microphone holder 303 can be detached. Therefore, according to the embodiment, not only attachment of the microphone 301, but also detachment or replacement of the microphone 301 can be performed easily.

Figure 8:
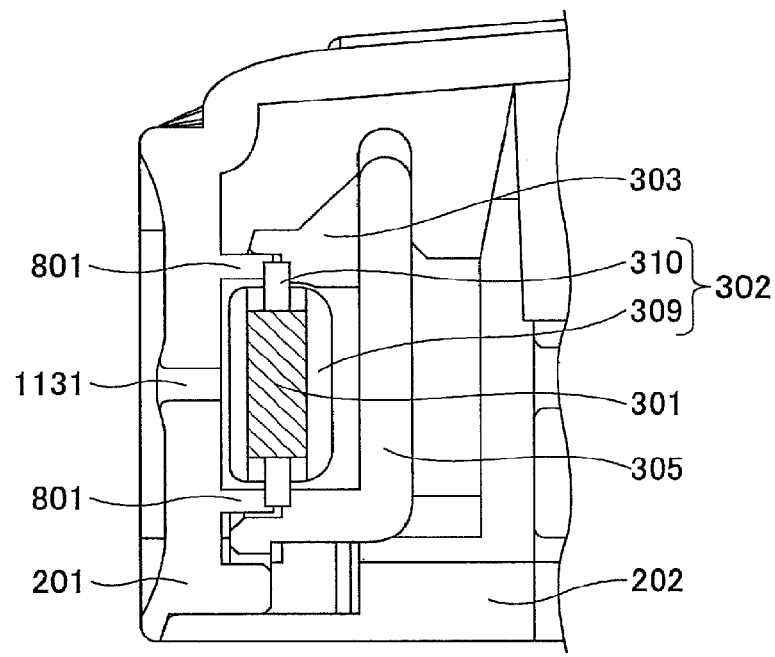
FIG. 8 is a cross-sectional view of a holding structure of the microphone according to the embodiment.

FIG. 8 is a cross-sectional view of a holding structure of the microphone according to the embodiment. FIG. 8 is a cross-sectional view of a state where after the microphone 301, the microphone rubber 302 and the microphone holder 303 are attached to the chassis upper cover 201, the chassis lower cover 202 is closed.

On the inner wall of the chassis upper cover 201, for example, a boss portion is arranged in a circular shape about the sound pickup hole 1131 so as to contact the flange portion of the microphone rubber 302. In addition, the boss portion 801 arranged in a circular shape is an example, and the boss portion 801 has a shape depending on an attachment portion of the microphone rubber 302 (flange portion 310 or the like).

As illustrated in FIG. 8, the microphone 301 is supported by the holding unit 309 of the microphone rubber 302. Moreover, the microphone rubber 302 is retained at a predetermined position of the chassis 1100 (See FIG. 1) by the flange portion 310 of the microphone rubber 302 held between the microphone holder 303 and the boss portion 801 arranged on the chassis upper cover 201 so as to be opposed to the microphone holder 303.

In the embodiment, the flange portion 310 of the microphone rubber 302 is fixed to the chassis 1100 (chassis upper cover 201), but the holding unit 309 is not directly fixed to the chassis 1100. Moreover, a predetermined gap is provided between the holding unit 309 of the microphone rubber 302 and the microphone holder 303 and the chassis 1100, and thereby a floating structure of the microphone 301 is enabled, and propagation of vibration from the chassis 1100 to the microphone 301 is reduced.

In addition, preferably a gap is provided between a portion other than the flange portion 310 of the microphone rubber 302 (holding unit 309 or the like) and the microphone holder 303 and the chassis 1100. However, the portion other than the flange portion 310 of the microphone rubber 302 may have a part that contacts the microphone holder 303 or the chassis 1100, if the portion other than the flange portion 310 of the microphone rubber 302 is substantially in a floating state with respect to the microphone holder 303 and the chassis 1100.

Moreover, because on the rear side of the microphone 301, the rear surface portion 305 of the microphone holder 303 is arranged, the rear surface portion 305 serves as a wall, and reduces noise reaching the microphone 301 from inside the chassis 1100.

Figure 9:
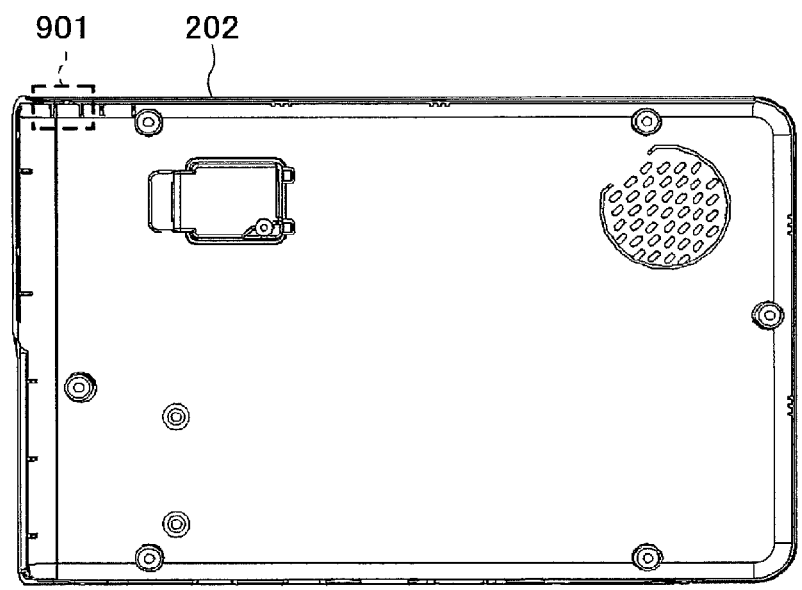
FIG. 9 is a diagram depicting a position of a rib for fixing holder of the chassis lower cover according to the embodiment.

FIG. 9 is a diagram depicting a position of a rib for fixing a holder of the chassis lower cover according to the embodiment. In an area 901 corresponding to the attachment position of the microphone holder 303 in the chassis upper cover 201 illustrated in FIG. 6, the second rib portions for fixing the microphone holder 303 are arranged.

Figure 10:
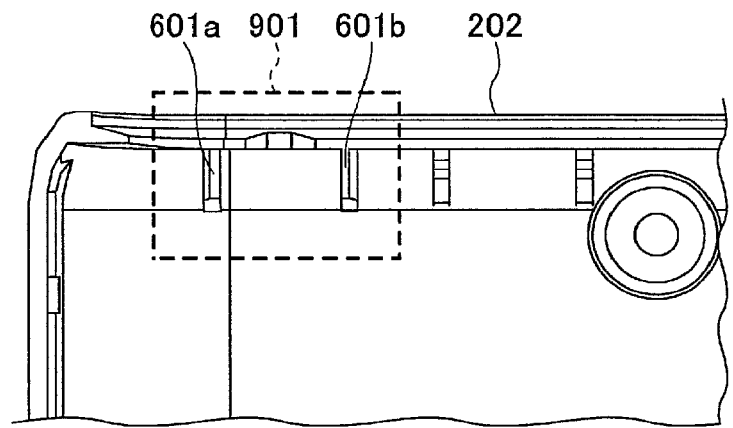
FIG. 10 is an enlarged view of the position of the rib for fixing holder of the chassis lower cover according to the embodiment.

FIG. 10 is an enlarged view of the rib for fixing holder of the chassis lower cover according to the embodiment. As illustrated in FIG. 10, in the area 901 of the chassis lower cover 202, the second rib portions 601a, 601b for fixing the microphone holder 303 are provided.

Figure 11:
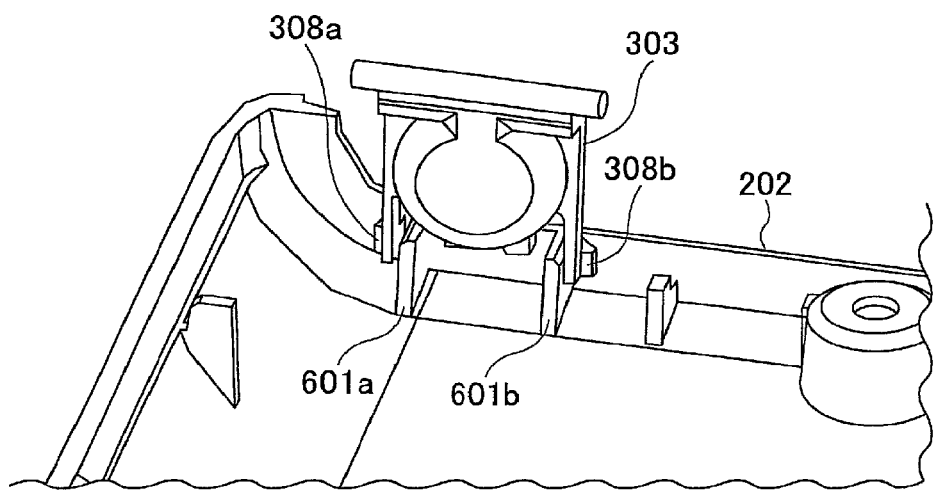
FIG. 11 is a diagram depicting an example of a rib for fixing holder according to the embodiment.

FIG. 11 is a diagram depicting an example of a rib for fixing a holder of the chassis lower cover according to the embodiment. As described above, when the chassis lower cover 202 is closed with respect to the microphone holder 303 attached to the chassis upper cover 201, the second rib portions 601a, 601b of the chassis lower cover 202 contact the inside of the claw portions 308a, 308b of the microphone holder 303, respectively. Accordingly, the claw portions 308a, 308b of the microphone holder 303 open outward, and the microphone holder 303 is fixed to the chassis upper cover 201 tightly and accurately.

As illustrated in FIGS. 9 through 11, the chassis lower cover 202 according to the embodiment only has to be provided with the second rib portions 601a, 601b inside thereof, and thereby the microphone holder 303 can be fixed to the chassis 1100 (chassis upper cover 201) without increasing the number of parts or without increasing the cost substantially.

In addition, the flange portion 310 of the microphone rubber 302 according to the embodiment is an example of the attachment portion. In the embodiment, in order to simplify a shape of the microphone rubber 302, the microphone rubber 302 illustrated in FIG. 4 is employed. However, the attachment portion of the microphone rubber 302 may have another shape.

For example, in the holding unit 309 of the microphone rubber 302, suppressing effect for propagation of vibration becomes higher as a contact area with the chassis 1100 is reduced. Moreover, in order to offer a sound pickup performance of the microphone 301, preferably a central portion of the sound pickup hole 1131 arranged in the chassis 1100 and a central portion of the microphone 301 accurately coincide with each other. The attachment portion of the microphone rubber 302, for example, may have a shape that retains the holding unit 309 at three points so as to satisfy the above-described two conditions.

Moreover, the embodiment is described that after the microphone holder 303 is attached to the chassis upper cover 201, the chassis lower cover 202 is attached. However, the embodiment does not restrict the range of the present invention. For example, the chassis lower cover 202 has a sound pickup hole 1131, and after the microphone holder 303 is attached to the chassis lower cover 202, the chassis upper cover 201, which is provided with the second rib portions 601a, 601b, is attached.

<Regarding Resonance>

Next, resonance of a space anterior to the microphone 301 will be described.

Figure 12:
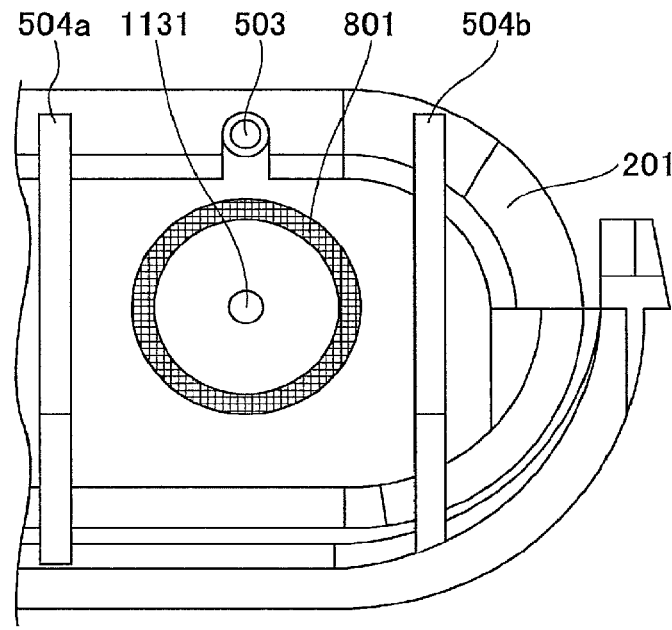
FIG. 12 is a diagram depicting an example of a shape of a boss portion according to the embodiment.

FIG. 12 is a diagram depicting an example of a shape of a boss portion according to the embodiment. The boss portion 801 is arranged on the inner wall of the chassis upper cover 201, for example, in a circular shape about the sound pickup hole 1131 so as to contact the flange portion 310 of the microphone rubber 302. Accordingly, the boss portion 801, opposed to the microphone holder 303, can retain the flange portion 310 of the microphone rubber 302.

In the above description, the case where the boss portion 801 has, for example, a circular shape about the sound pickup hole 1131 is explained. However, the boss portion 801 with a circular shape is an example, and the boss portion 801 may have a shape of, for example, an ellipse, a polygon or the like depending on a shape of the microphone rubber 302.

Figure 13:
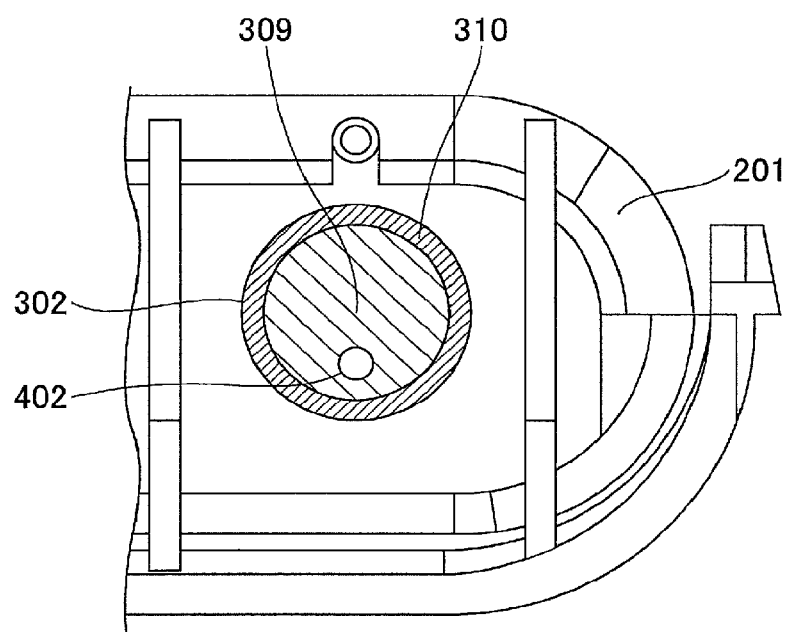
FIG. 13 is a diagram depicting an example of a microphone rubber arranged at the boss portion according to the embodiment.

FIG. 13 is a diagram depicting an example of a microphone rubber arranged at the boss portion according to the embodiment. As illustrated in FIGS. 12, 13, the shape of the boss portion 801 corresponds to a shape of the flange portion 310 of the microphone rubber 302. Therefore, the boss portion 801 illustrated in FIG. 12 is configured so as to contact the flange portion 310 of the microphone rubber 302 over the entire circumference.

Figure 14:
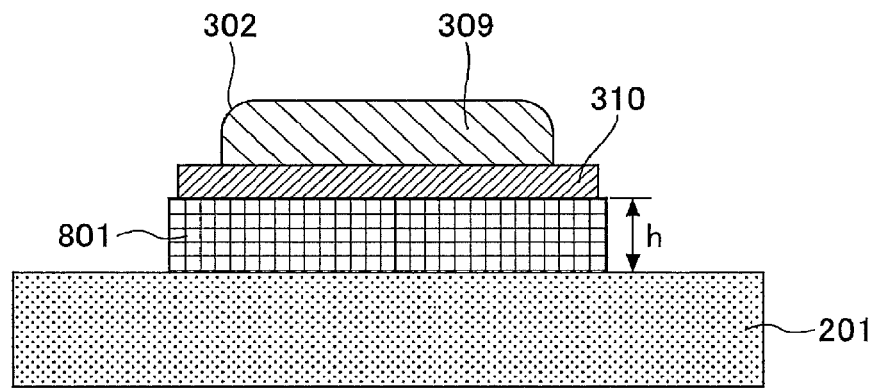
FIG. 14 is a diagram of the boss portion viewed from a side surface according to the embodiment.

FIG. 14 is a diagram of the boss portion viewed from a side surface according to the embodiment. As illustrated in FIG. 14, the boss portion 801 has a predetermined height "h" with respect to the inner wall of the chassis upper cover 201, and is arranged so as to contact the flange portion 310 of the microphone rubber 302.

Figure 15:
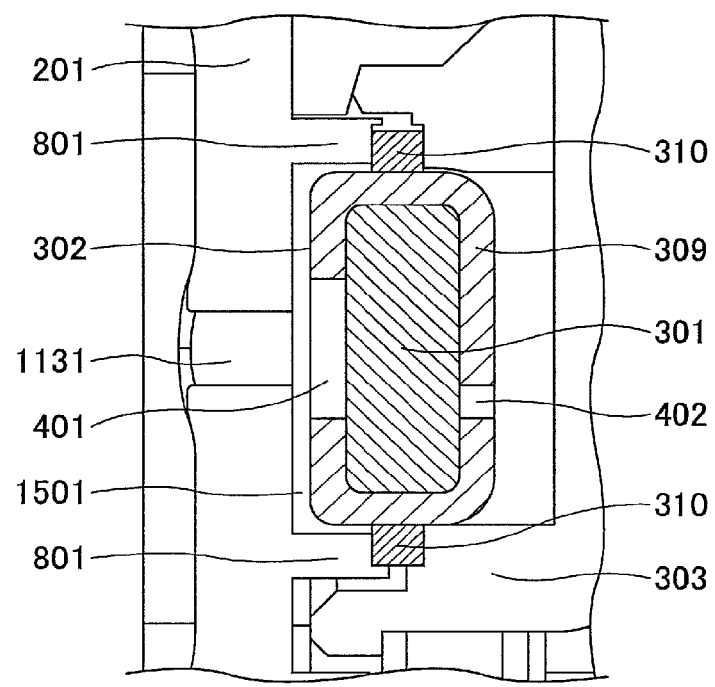
FIG. 15 is a cross-sectional view depicting a space anterior to the microphone according to the embodiment.

FIG. 15 is a cross-sectional view depicting a space anterior to the microphone according to the embodiment. When the microphone 301 is attached to the microphone rubber 302, the microphone rubber 302 is retained by the microphone holder 303 and the chassis lower cover 202 is closed, spaces (gaps) appear anterior to and posterior to the microphone 301, as illustrated in FIG. 15. In the embodiment, according to the spaces anterior to and posterior to the microphone 301, a floating structure for the microphone 301 is enabled.

At this time, the space 1501 appearing anterior to the microphone 301 and space inside the chassis are sealed by the boss portion 801 and the flange portion 30 of the microphone rubber. Therefore, in the embodiment, there is an effect that noise generated inside the chassis (e.g. sound from the cooling fan) and picked up by the microphone 301 is reduced.

In contrast, the space 1501 appearing anterior to the microphone 301 and the space inside the chassis are sealed, and thereby the space 1501 has an opening (sound pickup hole 1131). In the space 1501, resonance (Helmholtz resonance) may occur, and affect a frequency characteristic of the microphone 301.

Figure 16:
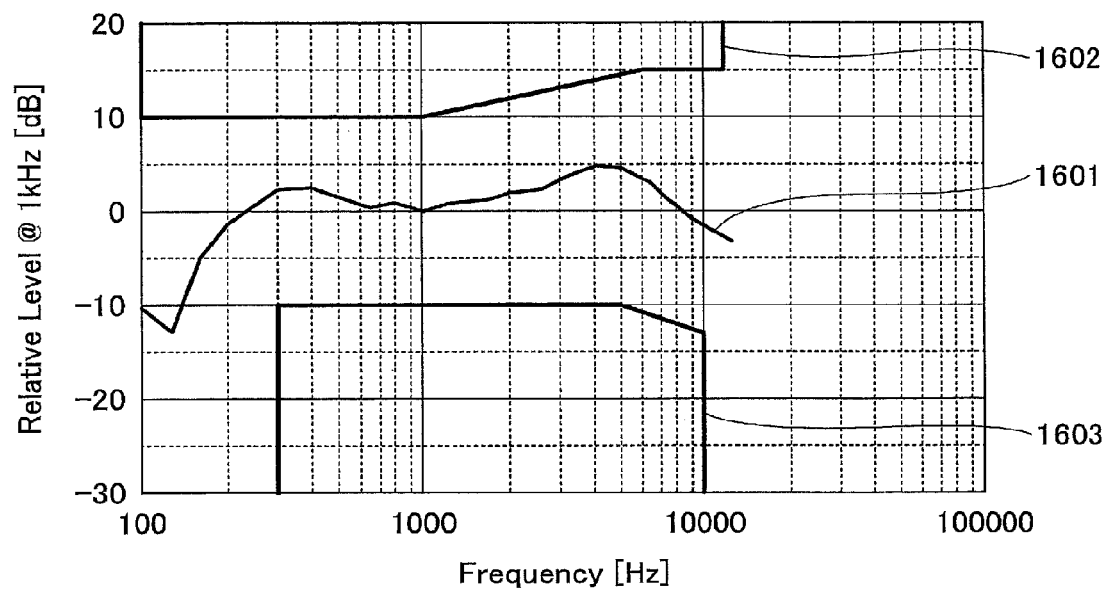
FIG. 16 is a diagram depicting an example of frequency characteristic of the microphone according to the embodiment.

FIG. 16 is a diagram depicting an example of the frequency characteristic of the microphone according to the embodiment. FIG. 16 illustrates an example of the frequency characteristic when the microphone 301 is not incorporated in the chassis.

In the conference apparatus 10 according to the embodiment, the frequency characteristic of the microphone 301 is preferably as flat as possible so that voice sound uttered by a user can be transmitted correctly to a conference apparatus of the communication destination. In the example of FIG. 16, the frequency characteristic 1601 of the microphone 301 preferably falls between a template indicating an upper limit of the frequency characteristic 1602 and a template indicating a lower limit of the frequency characteristic 1603.

Figure 17:
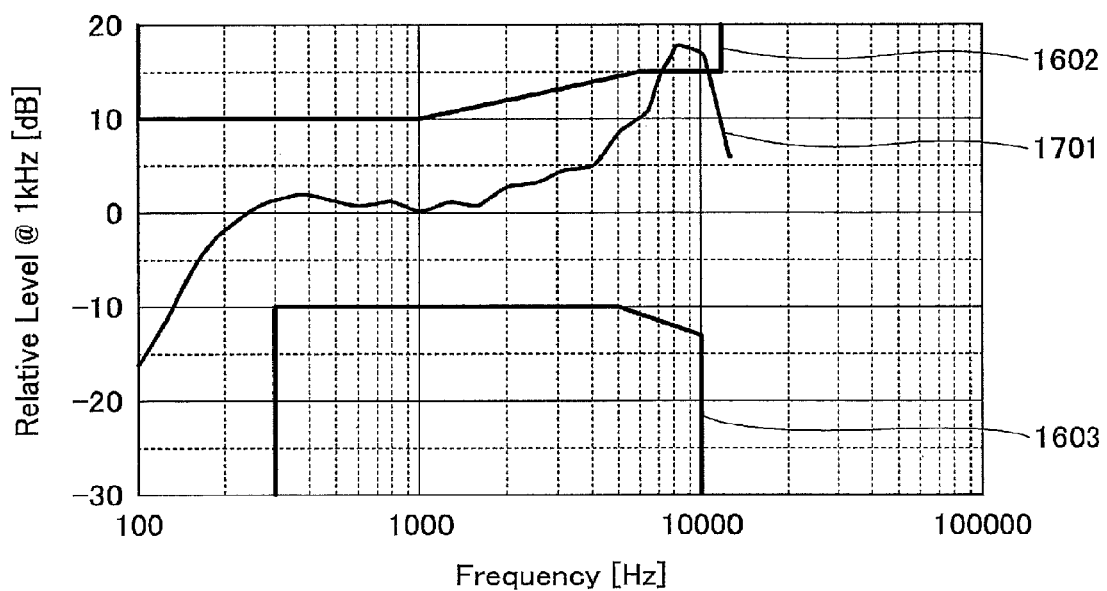
FIG. 17 is a diagram depicting an example of change in the frequency characteristic due to the space anterior to the microphone according to the embodiment.

FIG. 17 is a diagram depicting an example of change in the frequency characteristic due to the space anterior to the microphone according to the embodiment. FIG. 17 illustrates an example of a case where the microphone 301 is incorporated in the chassis as illustrated in FIG. 15, and thereby resonance (sympathetic vibration) occurs in the space 1501 anterior to the microphone 301, and a peak appears at around 8 to 10 kHz. In the example of FIG. 17, due to the resonance in the space 1501 anterior to the microphone 301, the frequency characteristic of the microphone 301 does not fall between the template indicating the upper limit 1602 and the template indicating the lower limit 1603.

Here, a measure to reduce the influence by the peak to the frequency characteristic of the microphone 301 will be described.

First Embodiment

In the embodiment, a notch is provided in the boss portion 801, and thereby the sealing structure between the space 1501 anterior to the microphone 301 and the space inside the chassis is eliminated and the resonance is prevented.

Figure 18:
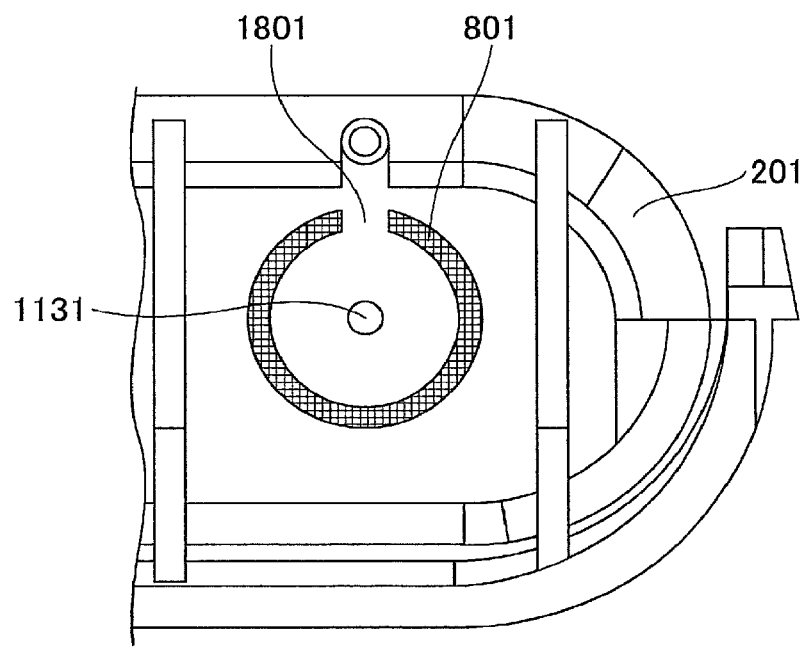
FIG. 18 is a diagram depicting an example of a notch of a boss portion according to a first embodiment.

FIG. 18 is a diagram depicting an example of a notch in a boss portion according to a first embodiment. In the example of FIG. 18, a part of the boss portion 801 is removed to provide a notch (open portion) 1801. The configuration illustrated in FIG. 18 is an example, and a number of notches may be two or more.

Figure 19:
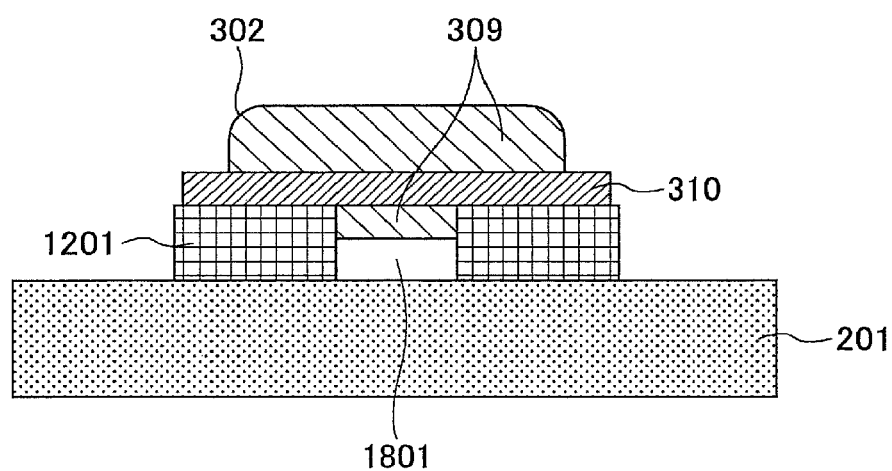
FIG. 19 is a diagram of the boss portion viewed from a side surface according to the first embodiment.

FIG. 19 is a diagram of the boss portion viewed from a side surface according to the first embodiment. According to the notch 1801, air can move freely between the space 1501 anterior to the microphone 301 and the space inside the chassis. Because Helmholtz resonance in which air in a space having an opening plays a role as a spring and resonates, by causing air in the space 1501 to move freely, the resonance can be prevented.

Figure 20:
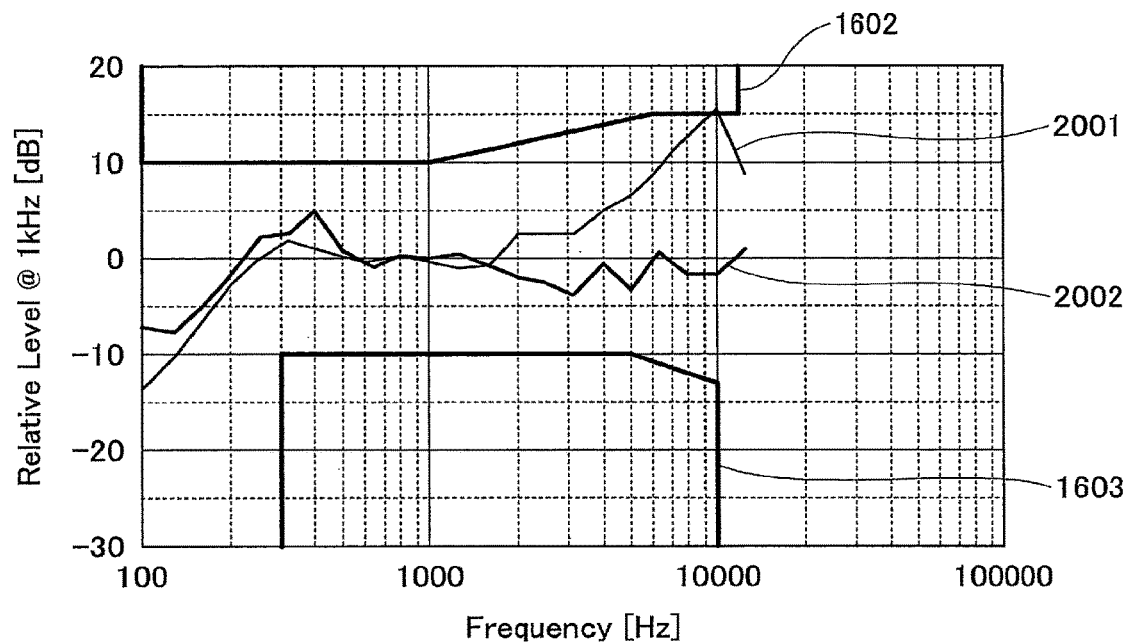
FIG. 20 is a diagram depicting an example of change in frequency characteristic due to the notch according to the first embodiment.

FIG. 20 is a diagram depicting an example of change in frequency characteristic due to the notch according to the first embodiment. With respect to the frequency characteristic 2001 in the case where there is not a notch in the boss portion 801, in the frequency characteristic 2002 in the case where there is a notch 1801 in the boss portion 801, the peak due to the resonance is eliminated.

In the embodiment, the space 1501 anterior to the microphone 301 and the space inside the chassis are not sealed, so the microphone 301 may be easily affected by noise from a cooling fan, a speaker or the like. Therefore, in the embodiment, a partition is preferably provided between the space 1505 anterior to the microphone 301 and the fan, speaker or the like inside the chassis to perform sound insulation.

Alternately, noise of the fan may be removed by a noise canceller or the like.

As described above, according to the embodiment, the boss portion is provided with a notch, and thereby resonance in the space 1501 anterior to the microphone 301 is prevented and an influence on the frequency characteristic of the microphone 301 can be prevented.

Second Embodiment

In the embodiment, the opening (sound pickup hole 1131) anterior to the microphone 301 is changed, and thereby the resonance (sympathetic vibration) frequency of the space 1501 anterior to the microphone 301 is moved, for example, to the outside of the frequency band used in electronic devices such as the conference apparatus 10.

The resonance (sympathetic vibration) frequency of the space 1501 anterior to the microphone 301 can be expressed by the following formula (mathematical expression for Helmholtz resonance)

$$f = \frac{c}{2\pi}\sqrt{\frac{S}{VL}} \quad \text{[Formula 1]}$$

In the above expression, f corresponds to resonance frequency, c corresponds to a sound velocity, S corresponds to an opening area of the opening (sound pickup hole 1131), V corresponds to a volume of inside (space 1501), and L corresponds to a length of the opening (sound pickup hole 1131). According to the formula, the resonance frequency f is found to be able to be increased, for example, by increasing the area of the opening of the sound pickup hole 1131.

Figure 21:
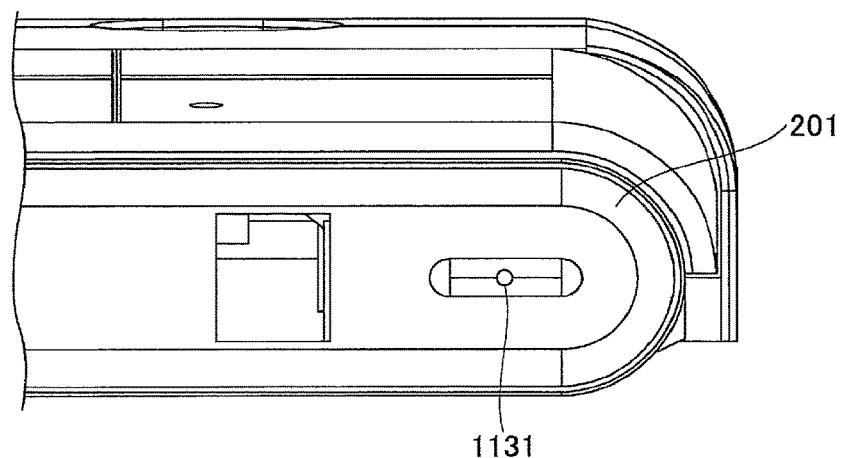
FIG. 21 is a diagram depicting an example of a sound pickup hole according to a second embodiment.

FIG. 21 is a diagram depicting an example of a sound pickup hole according to a second embodiment. The sound pickup hole 1131 is a through hole arranged approximately at a center of a circumference corresponding to the boss portion 801 and having a predetermined inner diameter (e.g. 1.5 mm). For example, by changing the inner diameter of the sound pickup hole 1131, the resonance frequency of the space 1501 can be changed.

Figure 22:
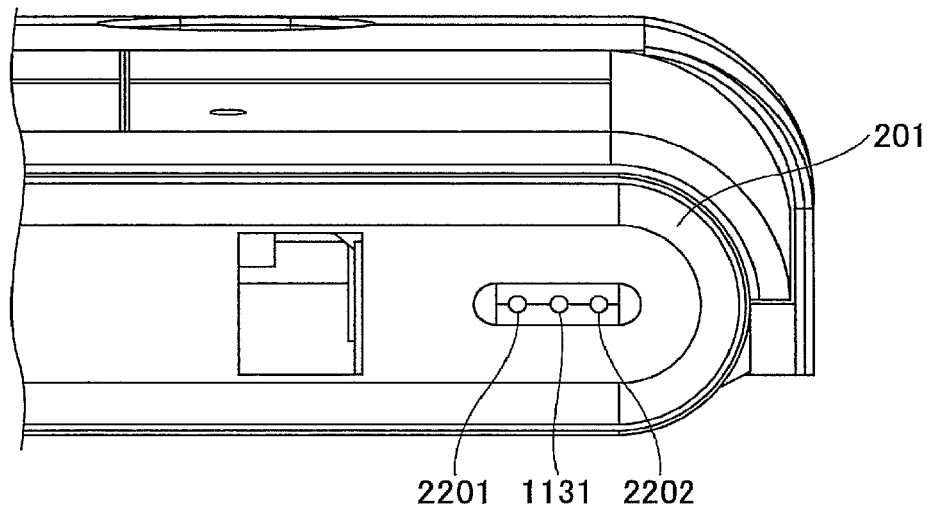
FIG. 22 is a diagram depicting another example of the sound pickup hole according to the second embodiment.

FIG. 22 is a diagram depicting another example of the sound pickup hole according to the second embodiment. In the example of FIG. 22, the inner diameter of the sound pickup hole 1131 is not changed, but additional sound pickup holes 2201, 2202 are provided, and thereby the opening area S of the opening of the space 1501 is substantially increased. The number of the additional sound pickup holes 2201, 2202 is an example, and may be another number. Moreover, the inner diameter of the additional sound pickup holes 2201, 2202 may not be the same as the sound pickup hole 1131.

Figure 23:
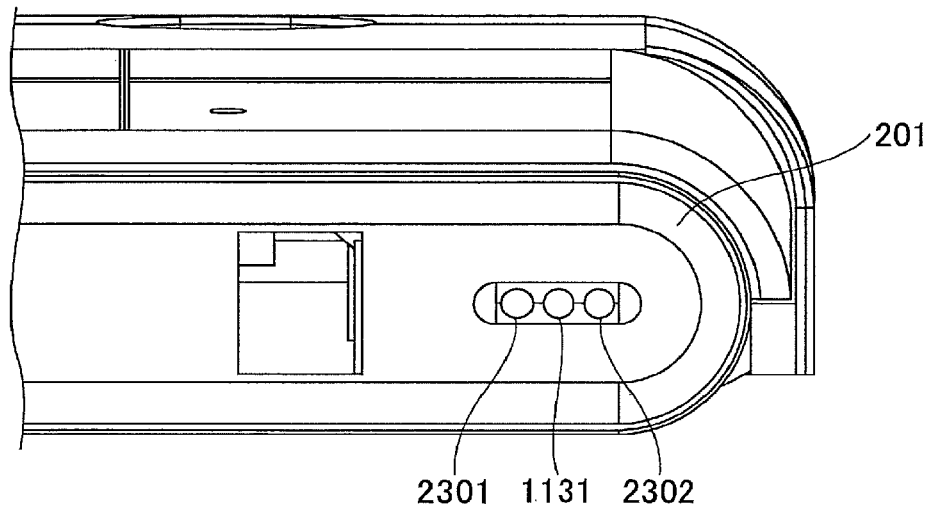
FIG. 23 is a diagram depicting a variation of the sound pickup hole according to the second embodiment.

FIG. 23 is a diagram depicting a variation of the sound pickup hole according to the second embodiment. In the example of FIG. 23, the inner diameter of the sound pickup hole 1131 is increased (e.g. 2 mm), and moreover, additional sound pickup holes 2201, 2202 are provided, and thereby the change in the resonance frequency becomes greater than the example of FIG. 22. In addition, in the example of FIG. 23, the inner diameter of the additional sound pickup holes 2201, 2202 is the same as the sound pickup hole 1131. However, the inner diameter of the additional sound pickup holes 2201, 2202 may be different from the inner diameter of the sound pickup hole 1131. Moreover, the number of the additional sound pickup holes 2201, 2202 may be another number.

In the above description, the explanation is made assuming that the openings of the sound pickup hole 1131 and the additional sound pickup holes 2201, 2202 have circular shapes. But, the shape does not restrict the scope of the invention. For example, the openings of the sound pickup hole 1131 and the additional sound pickup holes 2201, 2202 may have a shape of an ellipse, a polygon or the like. Moreover, regarding the change in the area of the openings of the sound pickup hole 1131 and the additional sound pickup holes 2201, 2202, the explanation is made assuming the inner diameter is changed. However, the area of the openings may be changed by changing sizes other than the inner diameter (e.g. a longitudinal length, a transverse length, or an aspect ratio).

As described above, according to the embodiment, by changing the inner diameter of the sound pickup hole 1131 and/or adding sound pickup holes, the resonance frequency of the space 1501 anterior to the microphone 301 is changed, and thereby the influence on the frequency characteristic of the microphone 301 can be reduced.

Moreover, in the embodiment, because the state where the space 1501 anterior to the microphone 301 and the space inside the chassis are sealed by the boss portion 801 is retained, the influence of the resonance of the space 1501 can be reduced while maintaining the sound insulation.

Third Embodiment

In the embodiment, for example, the chassis anterior to the microphone 301 is made thinner or the length of the sound pickup hole 1131 is made shorter, and thereby the resonance (sympathetic vibration) frequency of the space 1501 anterior to the microphone 301 is moved to the outside of the frequency band used in electronic devices such as the conference apparatus 10. According to the above-described mathematical expression for Helmholtz resonance, the resonance frequency by the space 1501 is found to be able to be made greater by shortening the length L of the sound pickup hole 1131.

Figure 24A:
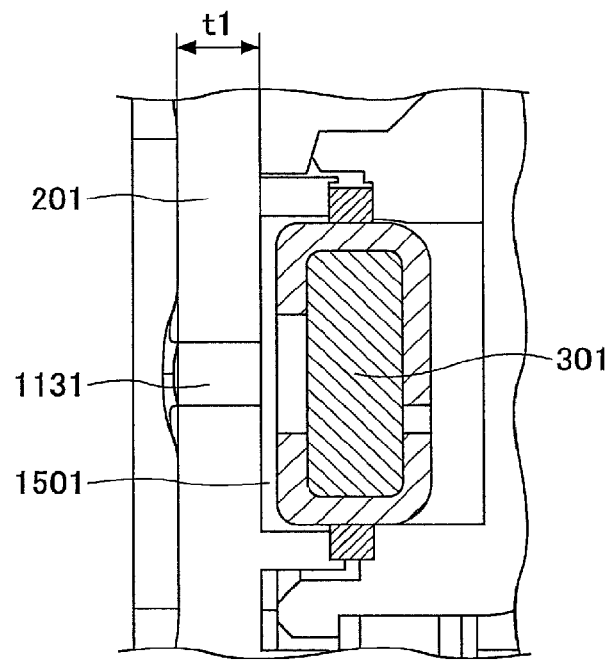
FIGS. 24A and 24B are diagrams for explaining a difference in a length of a sound pickup hole according to a third embodiment.
Figure 24B:
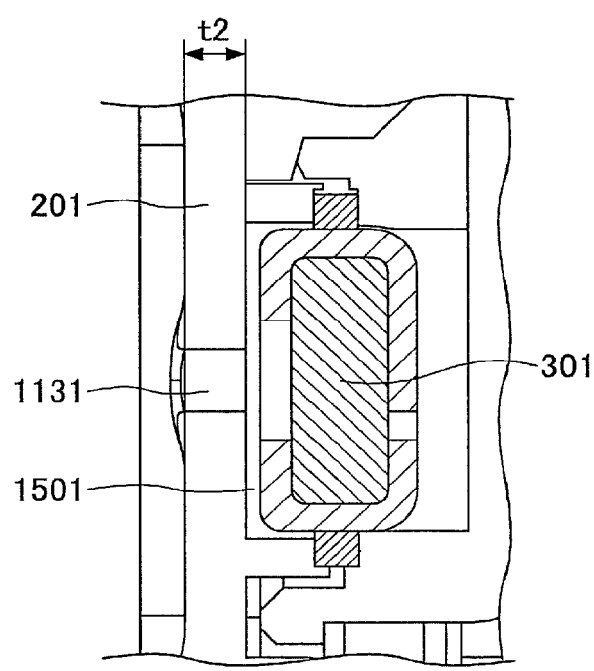

FIGS. 24A and 24B are diagrams for explaining a difference in a length of a sound pickup hole according to a third embodiment. FIG. 24A depicts a state before taking measures. The thickness of the chassis anterior to the microphone 301 is assumed to be t1 (e.g. 2 mm). Moreover, FIG. 24B depicts a state after taking measures according to the embodiment. The thickness of the chassis anterior to the microphone 301 is assumed to be t2 (e.g. 1.5 mm), which is thinner than the chassis in FIG. 24A.

Therefore, the length of the sound pickup hole 1131 in FIG. 24B is less than the length of the sound pickup hole 1131 in FIG. 24A. In this way, by changing the thickness of the chassis anterior to the microphone 301, the resonance frequency of the space 1501 can be changed.

In the example of FIGS. 24A and 24B, the thickness of the chassis anterior to the microphone 301 is reduced. However, it goes without saying that only a part around the sound pickup hole 1131 may be made thinner.

According to the embodiment, the resonance frequency of the space 1501 anterior to the microphone 301 can be changed without increasing the area of the opening of the sound pickup hole 1131 and the number of the sound pickup holes, and the influence on the frequency characteristic of the microphone 301 can be reduced.

Other Embodiment

According to the above-described mathematical expression for Helmholtz resonance, the resonance frequency of the space 1501 is found to be able to be changed also by changing the volume V of the space 1501. For example, by changing the height h of the boss portion 801, illustrated in FIG. 14, the volume of the space 1501 can be changed. Specifically, by reducing the height h of the boss portion 801, the volume V of the space 1501 is reduced, and thereby the resonance frequency of the space 1501 is made higher. It goes without saying that the above-described changes of the area S of the opening of the space 1501, the length L of the opening, and the volume V can be implemented in arbitrary combination.

Moreover, by correcting the change in the frequency characteristic of the microphone 301 due to the resonance of the space 1501 by acoustic processing, such as an equalizer, the frequency characteristic can be brought close to flat. However, because adjustment by an equalizer could lead to voice degradation, the frequency before adjustment is preferably close to flat.

The technique disclosed in Japanese Unexamined Patent Application Publication No. 2004-312094 is a floating structure using a magnetic force, and has a problem of low incorporating property and high cost. Moreover, the technique disclosed in Japanese Unexamined Patent Application Publication No. 2004-304263 requires screwing from the rear side, and incorporating or replacing a microphone within a limited space of a small electronic device or the like is quite difficult. Moreover, in the technique disclosed in Japanese Unexamined Patent Application Publication No. 2003-299173, because a contact area of a microphone and a chassis via an elastic member is great, suppressing the propagation of vibration from a chassis to the microphone is difficult.

In this way, in the conventional technique, incorporating a microphone in a limited space of an electronic device or the like, at low cost, while preventing a vibration from propagating from a chassis to the microphone is quite difficult.

In view of the above, providing a holding structure for a microphone, in which incorporating the microphone in a limited space of an electronic device or the like at low cost, while preventing a vibration from propagating from a chassis to the microphone is easy, is desirable.

According to at least one embodiment, a holding structure for a microphone is provided, in which incorporating the microphone in a limited space of an electronic device or the like at low cost, while preventing a vibration from propagating from a chassis to the microphone, is easy.

SUMMARY

As described above, the microphone holding structure according to the embodiment includes a holding unit 309 formed of an elastic material for holding a microphone 301; and an elastic member (microphone rubber 302) having an attachment portion (flange portion 310) arranged around the holding unit 309. Moreover, the microphone holding structure includes a retention member (microphone holder 303) for retaining the attachment portion (flange portion 310) at a predetermined position (boss portion 801) of a first chassis (chassis upper cover 201). Furthermore, the microphone holding structure includes a second chassis (chassis lower cover 202) for fixing the retention member (microphone holder 303) to the first chassis (chassis upper cover 201).

According to the above configuration, a floating structure for the microphone 301 is enabled only by the microphone rubber 302, the microphone holder 303 and chassis 1100 (chassis upper cover 201, chassis lower cover 202).

Therefore, according to the embodiment, the microphone holding structure in which a microphone can be easily incorporated into a limited space of an electronic device or the like with a low cost while preventing a vibration from propagating from the chassis to the microphone can be provided.

Moreover, according to the embodiment, by detaching the chassis lower cover 202 from the chassis 1100, detachment, replacement or the like of the microphone 301 becomes easy. Therefore, the microphone holding structure in which a microphone is attachable/detachable in a limited space of an electronic device or the like with a low cost while preventing a vibration from propagation from the chassis to the microphone can be provided.

Moreover, because the microphone 301 is sealed on the side surface and the rear surface by the microphone rubber 302 and the microphone holder 303 according to the above-described microphone holding structure, sound pickup of noise occurring inside the chassis, such as a fan, can be reduced.

Further, the present invention is not limited to these embodiments, but various variations and modifications may be made without departing from the scope of the present invention.

REFERENCE SIGNS LIST

1100 chassis
201 chassis upper cover (first chassis)
202 chassis lower cover (second chassis)
301 microphone
302 microphone rubber (elastic member)
303 microphone holder (retention unit)
306 attachment shaft (shaft portion)
308a,308b claw portions
309 holding unit
310 flange portion (attachment portion)
502a,502b bearing portions
503 projection portion
504a,504b first rib portions
601a,601b second rib portions
801 boss unit

What is claimed is:

1. A holding structure for holding a microphone, comprising:
   a chassis configured to be separated into at least a first chassis and a second chassis;
   an elastic member formed of an elastic material, the elastic member including a holding unit configured to hold the microphone and an attachment portion provided in a periphery of the holding unit; and
   a retention member configured to retain the attachment portion at a predetermined position on the first chassis, the retention member being fixed to the first chassis by the second chassis in a state where the second chassis is attached to the first chassis,
   wherein the first chassis includes a first rib portion configured to attach the retention member, and a projection portion, and
   wherein the retention member includes a claw portion corresponding to the first rib portion and a notch portion corresponding to the projection portion.

2. The holding structure according to claim 1,
   wherein a gap is provided between the holding unit and the chassis, and between the holding unit and the retention member.

3. The holding structure according to claim 1,
   wherein the second chassis includes a second rib portion that contacts the claw portion of the retention member when the second chassis is attached to the first chassis.

4. The holding structure according to claim 1,
   wherein the retention member includes a shaft portion; and
   wherein the first chassis includes a bearing portion configured to support the shaft portion.

5. The holding structure according to claim 1,
   wherein the first chassis includes a boss portion configured to retain the attachment portion, the boss portion being opposed to the retention member.

6. An electronic device including the holding structure for holding a microphone according to claim 1.

7. A holding structure for holding a microphone, comprising:

a chassis configured to be separated into at least a first chassis and a second chassis;

an elastic member formed of an elastic material, the elastic member including a holding unit configured to hold the microphone and an attachment portion provided in a periphery of the holding unit; and a retention member configured to retain the attachment portion at a predetermined position on the first chassis, the retention member being fixed to the first chassis by the second chassis in a state where the second chassis is attached to the first chassis, wherein the retention member includes a shaft portion; and wherein the first chassis includes a bearing portion configured to support the shaft portion.

8. An electronic device including the holding structure for holding a microphone according to claim 7.

* * * * *